United States Patent [19]

Stephenson et al.

[11] Patent Number: 5,205,964

[45] Date of Patent: Apr. 27, 1993

[54] METHOD OF BREAKING CRUDE OIL EMULSIONS USING ETHYLENE CARBONATE ADDUCTS OF ALKYLPHENOL-FORMALDEHYDE RESINS

[75] Inventors: W. Kirk Stephenson, Sugarland; J. Derwin DeShazo, Richmond, both of Tex.

[73] Assignee: Nalco Chemical Company, Naperville, Ill.

[21] Appl. No.: 789,521

[22] Filed: Nov. 7, 1991

Related U.S. Application Data

[62] Division of Ser. No. 151,054, Feb. 1, 1988, abandoned.

[51] Int. Cl.$^5$ .............................................. B01D 17/05
[52] U.S. Cl. .................................. 252/340; 208/188; 252/8.554
[58] Field of Search ............ 208/188; 252/340, 8.554; 525/480; 528/129

[56] References Cited

U.S. PATENT DOCUMENTS

| 2,620,321 | 1/1952 | Schrader et al. | 528/129 |
|---|---|---|---|
| 2,807,606 | 9/1957 | Lincoln | 528/301 |
| 2,972,600 | 2/1961 | Braidwood | 525/480 |
| 4,330,481 | 5/1982 | Timberlake et al. | 260/463 |
| 4,357,457 | 11/1982 | Harris | 525/502 |
| 4,415,502 | 11/1983 | Timberlake et al. | 260/463 |
| 4,551,239 | 11/1985 | Merchant et al. | 252/358 |
| 4,614,783 | 9/1986 | Daimer et al. | 525/504 |
| 4,787,454 | 11/1988 | Naae et al. | 252/8.554 |

FOREIGN PATENT DOCUMENTS

| 47-43315 | 11/1972 | Japan . | |
| 54-161611 | 12/1979 | Japan . | |
| 57-182313 | 11/1982 | Japan | 525/480 |

OTHER PUBLICATIONS

Fumasoni, "Reactions . . . ", Ann. Chim. (Rome), 54 (1-2), 73-9 (1964).
Chemical Abstract 102:97319W, Polyethoxylation of Alcohols, Rom. RO 83, 751, Vizitiu, et al.
Chemical Abstract 97:94445b, Polycarbonate Type Surfactants, U.S. Pat. No. 4,330,481, Timberlake et al.

(List continued on next page.)

Primary Examiner—Gary L. Geist
Attorney, Agent, or Firm—Robert A. Miller; Joseph B. Barrett

[57] ABSTRACT

A method of breaking crude oil emulsions using a water-in-oil emulsion breaker obtained by the reaction, in anhydrous conditions, for at least one hour, of an alkyl substituted phenol-formaldehyde polymer having the structure:

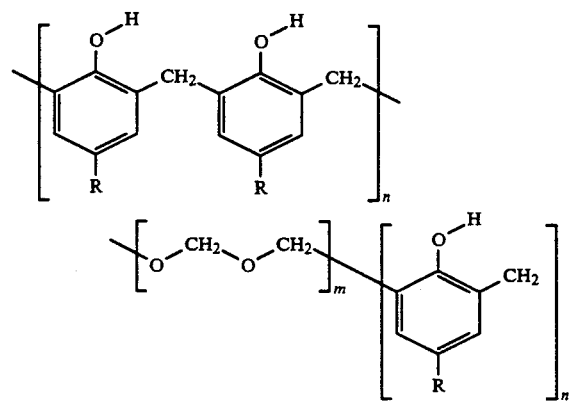

wherein R is a linear or branched alkyl group having from 4–20 carbon atoms, and wherein m and n are both independent integers, the sum of which is sufficient to achieve a molecular weight of at least 1000 and further that m, but not n, may be zero with (b) ethylene carbonate, said reaction being further accomplished in a common oleophilic solvent having a boiling point of at least 180° C., the reaction further at a temperature of at least 160° C. in the presence of an alkaline catalyst, said catalyst being present at a concentration, based on total weight of reactants a & b, of at least about 0.1 weight percent.

5 Claims, No Drawings

OTHER PUBLICATIONS

Chemical Abstract 3011n Poly(Oxyethylene), U.S.S.R. 182,333, S. Z. Levin et al.

Chemical Abstracts 61:3211e, Reactions of Ethylene & Propylene Carbonates, Ann. Chim. (Rome) 54(1-2), 73-9 (1964) S. Fumasoni, et al.

Chemical Abstracts 52:3407i, Condensation Polymers & Intermediates, U.S. Pat. No. 2,807,606, Lincoln.

Polymer Letters Edition, vol. 14, pp. 161-165 (1976), Entitled "New Type of Polymerization of Ethylene Carbonate".

Journal of Polymer Science, vol. 15, 219-229 (1977), Soga, et al. "Polymerization of Propylene Carbonate".

METHOD OF BREAKING CRUDE OIL EMULSIONS USING ETHYLENE CARBONATE ADDUCTS OF ALKYLPHENOL-FORMALDEHYDE RESINS

This is a divisional of co-pending application Ser. No. 07/151,054 filed on Feb. 1, 1988 now abandoned.

INTRODUCTION

Crude oils recovered from producing wells normally are recovered in the form of water-in-oil emulsions. In addition, in the processing of said crude oils, other types of water-in-oil emulsions may be formed and in some cases oil-in-water emulsions are also formed.

Prior to further processing of these types of crude oil emulsions or the emulsions formed in the initial processing, the processor must break these emulsions and concentrate oil phases and isolate these phases from the aqueous phases which often contain salt contaminates and corrosive materials which could damage processing equipment.

It is common to use as active emulsion breakers certain intermediate compounds derived from alkyl phenol-formaldehyde resins which in turn have been adducted with ethylene oxide and propylene oxide and in some cases other types of alkylene oxide compounds. In some cases these adducted products are quite active and are beneficially used to treat crude oils which are recovered in water-in-oil emulsion forms. However, in some cases the handling of ethylene oxide, propylene oxide and other alkylene oxide can be dangerous, particularly when sophisticated equipment is not available, such as in third world countries.

As a result, it would be an advance in the art if similar types of emulsion breaker compounds could be developed with processes that could be practiced when such sophisticated safety equipment could not be available.

In an attempt to achieve these active emulsion breakers, we have discovered that in controlled reactions of ethylene carbonate, or 1,3-Dioxolan-2-one, as represented by Formula 1 below,

STRUCTURE 1

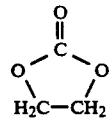

we can achieve active emulsion breakers which contain additional chemical structures that yield materials that are at least as active as the materials formed by ethoxylation or propoxylation and in some cases more active. Activity as herein described is measured in terms of the amount of time taken to break these types of crude oil emulsions at a given temperature and a given emulsion breaker dosage.

THE INVENTION

We have developed a water-in-oil emulsion breaker which is obtained by reacting, in anhydrous conditions, for at least one hour the component (a) alkyl substituted phenol-formaldehyde polymer having the structure;

STRUCTURE 2

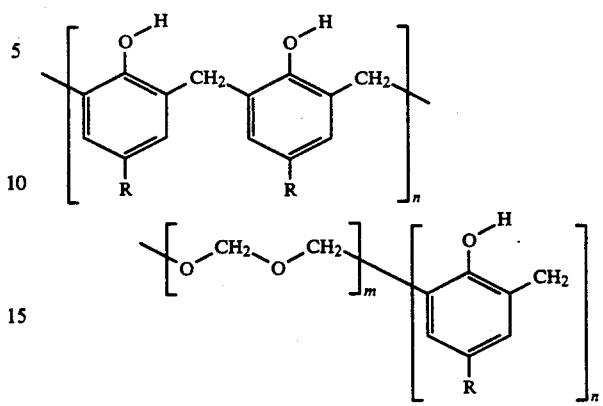

wherein R is a linear or branched alkyl group having from 4–20 carbon atoms, and wherein m and n are, at every occurrence, both independent integers, the sum of which is sufficient to achieve a weight average molecular weight of at least 1000, and further that m, but not n, may be zero with the component (b), ethylene carbonate.

In the above structure, each repeating mer unit represented in the brackets describing mer unit chemical structure, and being present m and/or n times, are randomly distributed within the polymer backbone so as to achieve random distribution of repeating mer units.

This reaction is further accomplished in a common oleophilic (organic) solvent having a boiling point of a least 180° C. The reaction is accomplished at a temperature of reaction of at least 160° C., in the presence of an alkaline catalyst, said catalyst being present at a concentration, based on total weight of components a+b, of at least about 0.1 weight percent.

The alkyl substituted phenol-formaldehyde polymer preferably has an R group which is either linear or branched and contains from about 4–12 carbon atoms, and is most preferably substituted by a butyl or nonyl alkyl group.

The repeating unit represented by structures having an m number of repeating units are arguably manufactured during the synthesis of the alkyl substituted phenol-formaldehyde polymer. These structures can be temperature sensitive and may exist initially but when exposed to high temperatures, the concentration of this repeating unit can be greatly decreased.

"n" and "m", as indicated above, are independently chosen, at each occurrence, from integers the sum of which is sufficent to achieve a weight average molecular weight of at least 1000, preferably a weight average molecular weight ranging between about 1000–100,000 and most preferably a molecular weight ranging between about 2500–50,000. To be particularly effective as an emulsion breaker, this backbone polymer has a molecular weight ranging most preferably between about 3000–12,000. As stated above n must always be, at each occurrence of the respective mer unit, a numerical integer and may not be zero, although m may optionally be zero depending upon the stability of the methylene oxide linking structure.

The reaction is accomplished preferably in a common oleophilic solvent which solvent may be aromatic, alkaryl, aralkyl, or mixtures thereof. Preferably the common oleophilic solvent is a high boiling alkyl substituted aromatic cut obtained from the processing of crude oils. Additionally, other common solvents which are useful include alkyl-capped multiple alkoxides such as the diethylether of tetraethylene glycol. The solvents may be used as received from manufacturers or may be admixed in any proportion to achieve the necessary goal of having a common solvent effect for both the alkyl substituted phenol-formaldehyde polymer, component a, and the component b, ethylene carbonate. The solvent is preferably dried before use to achieve the anhydrous reaction conditions desirable to achieve our products.

The alkaline catalyst is preferably chosen from the group consisting of sodium hydroxide, potassium hydroxide, sodium carbonate, potassium carbonate or any admixture thereof. It is present generally at a concentration ranging between about 0.1 weight percent up to about 10 weight percent, based on the total weight of the reactants, components, a+b, i.e. the phenol-formaldehyde polymers and the ethylene carbonate. Although the reaction is accomplished in a common solvent at a temperature of at least 160°C., the common solvent normally has a boiling point of at least 10° and preferably 20° C. or more above the maximum reaction temperature. The reaction temperature is at least 160° C. and is preferably at least 180° C. and most preferably ranges between about 180° C. to about 220° C., with the reaction at each temperature accomplished at ambient pressures, although pressure above atmospheric pressure can be used if appropriate. Temperature may be held constant or may be increased with time as the reaction proceeds. An appropriate temperature range is from 160°-220° C.

The facile reaction is achieved after a reaction time of at least one hour, preferably at least two hours, and commonly a reaction time ranging between about two to about 10 hours, and up to about 40 hours, depending on the concentration of ingredients, reaction temperatures, control of foaming caused by the release of carbon dioxide and other like reaction phenomenon. One may simply batch react the resin and ethylene carbonate. It is, however, preferable that the reaction is started with a ratio of ethylene carbonate to phenol type resin below what is needed to accomplish the goal of substituting repeating ethylene oxide, and/or ethylene carbonate units into the active ingredient of the emulsion breaker formulations. After the reaction is initiated at the reaction temperatures and under the conditions cited above, it therefore is preferred to continue, either at a variable rate or at a constant rate, the addition of the (reactant) ethylene carbonate. It is most preferred to add on a continuous basis, the remaining portion of the ethylene carbonate which is not initially charged to the reaction mixture at the beginning of the reaction between the phenol-formaldehyde polymer and the ethylene carbonate reactants.

Ethylene carbonate, or 1,3-Dioxolan-2-one, is represented as a non-flammable, non-explosive, practically non-toxic compound which is a solid at room temperature having a melting point of about 36° C., a boiling point of about 243° C., which characteristics make ethylene carbonate a safe non-hazardous chemical reactant. On the other hand, ethylene oxide has a boiling point of about 13° C. and represents a severe health hazard, fire hazard and explosion hazard, unless treated cautiously.

The reactions of ethylene carbonate with the phenol-formaldehyde polymers can produce a very foamy intermediate stage of relatively high viscosity which if unaltered, can create foam problems, gel particles and severe reaction difficulties. This foam is caused by a simultaneous release of carbon dioxide and the adducts of this reaction as formed. To prevent these problems, it is possible to add to the reaction, surfactants which can aid in the escape of carbon dioxide from reacting ingredients. The surfactants, or surface active agents are oil soluble and normally have an HLB of from 1.0–10.0. This reduces foaming and associated gel problems. It has been found that carbon dioxide generation and the accompanying foaming problems can best be controlled by the semi-batch, incremental or continuous addition of the ethylene carbonate reactant either in the presence or absence of surfactants or surface active agents which have an HLB of from about 1.0–10.0.

The reaction mixture can be accomplished with a total percent active solids, after combining the reactants, ranging between about 20–80 weight percent, preferably between about 40–75 weight percent, and most preferably between about 50–70 weight percent. A batch reaction normally achieves a solids level ranging up to about 40–45 weight percent, but the incremental or continuous addition of ethylene carbonate can permit the formation of emulsion breaker formulations containing from 70–75% actives (solids basis) as the formulas above dissolved or dispersed in the organic solvents used as reaction solvents.

Although it is difficult to characterize the products of this invention, it has been determined that these products, or their intermediates, may contain some portion of cross-linked structures having the following formulation:

STRUCTURE 3

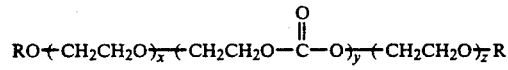

wherein x, y, and z are each, independently, integers ranging from 0–20, preferably from 0–12, and most preferably from 0–8, provided that the sum, x+y+z, is not zero. R is, in Structure 3, the resin portion of the alkyl substituted phenol-formaldehyde polymer, or

In structure 3 above, one can see that these cross-links may also contain, in addition to ethoxylate linkages, a carbonate linkage which itself may be subject to degradation at higher temperatures.

Infrared analysis has demonstrated, with an absorbence at about 1750 cm$^{-1}$, the presence of what is believed to be the carbonate cross-linking unit, which presence can be affected by the final reaction temperatures and/or the final reaction times needed to accomplish the reactions described above.

Surprisingly, it is believed that emulsion breakers, or formulation containing same, which have some portion of these carbonate linked structures have the most effective emulsion breaker characteristics or have higher activity when used to break water in crude oils emulsions as anticipated in this invention.

EXPERIMENTAL

To further demonstrate my invention, I provide the following experiments:

Experiment 1 — A nonyl phenol-formaldehyde resin having a weight average molecular weight ranging between about 6000–8000 was reacted with ethylene carbonate at a temperature ranging between about 165° C. and about 195° C. for about eight hours. The ethylene carbonate was initially added to the reaction mixture at about 10 weight percent of the total amount necessary to accomplish an equivalent ethoxylate ratio to phenol-formaldehyde polymer backbone ranging between about 2.5 and 4 ethoxylate repeating units per repeating mer unit in the polymer backbone. Reaction conditions included about 40 percent solids in an alkylated aromatic type solvent. Table 1 gives gel permeation chromotography data for the starting alkylated phenol-formaldehyde resin, and the products derived from the reactions of ethylene carbonate under scenario 1, scenario 2, and the "final procedure". Scenario 1 is a batch reaction, Scenario 2 is a continuous addition of ethylene carbonate, and the "final procedure" is a continuous addition of about 90% of the total amount of ethylene carbonate to a reaction vessel containing all the phenol-formaldehyde resin, 10% of the ethylene carbonate and about 0.5–1.0 weight percent KOH (based on solids), and in a vessel having an initial temperature of about 165° C. and a final temperature of about 195° C. Reaction time was about 8 hours, during which the temperature was revised upwardly hourly from 5–15° C. until the final temperature was reached. Molecular weights are described in terms of weight average molecular weight, number average molecular weight, and polydispersity.

| GPC Data | | | |
|---|---|---|---|
| Compound Description | $M_w$ | $M_n$ | PD |
| Nonyl phenol-formaldehyde resin | 7600 | 2800 | 2.7 |
| Nonyl phenol-formaldehyde-ethoxylated (EO) | 10200 | 3600 | 2.8 |
| Prod from 40% solids rx (scenario 1) | 12900 | 3400 | 3.8 |
| Intermediate from 40% solids rx (scenario 2) | 55100 | 5200 | 10.6 |
| Prod from 40% solids rx (after extended heating) (scenario 2) | 15700 | 3800 | 4.1 |
| Prod from 70% solids rx (final procedure) | 11500 | 3400 | 3.4 |

Scenario 1 is a batch reaction of the starting polymer described above, in the presence of potassium hydroxide catalyst, and ethylene carbonate, in an alkylated aromatic high boiling solvent at a temperature of 165° C., which reaction yields a brown intermediate which either: 1) remains relatively thin with no or only slight foaming and with no formation of foam or gel particles or, 2) becomes very viscose and foamy with subsequent formation of foam and gel particles, the foam particles being spongy and having a lower density than the reaction mixture since they float on the liquid reactant mixture surface. The gel particles on the other hand have a higher density since they settle to the reaction mixture bottoms. Reaction temperatures are raised incrementally, in steps of from about 5° to 10° C. from about 165° C. to about 195° C. Said incremental temperature increase was done approximately hourly to control foam generation. It is believed that the high viscosity intermediates obtained in scenario 2 are caused by a relatively high but undetermined amount of carbonate cross-linked compounds as represented in structure 3 above, where, again, R, or

represents the backbone of the initial alkyl phenol-formaldehyde polymer.

The preferred reaction products, and particularly the intermediates, have a characteristic infrared absorbence at about 1750 cm$^{-1}$ which absorbence is believed to be due to the carbonate structures represented in structure 3 above.

Using the formulations obtained from scenario 1, scenario 2, and the final procedure, crude oils were treated with from 0.0001 to up to about 5.0 weight percent of these formations to determine emulsion breaking activities. The formulations of the instant invention provided equal or superior results at each effective dose when compared to the ethoxylated phenol-formaldehyde resin listed in the table above, or commercially available product. In addition, the practice of this invention permits synthesis of my emulsion breakers in third world countries where ethylene oxide may be unavailable or prohibited or difficult to use because of its inherent hazardous nature.

To further demonstrate the improvements derived from our invention, comparison information collected from bottle testing of active emulsion breakers derived from the reaction of the phenol-formaldehyde resin backbones with either alkylene oxides or alkylene carbonates was run. In each case, the weight percent of backbone resin was held constant, and the alkoxylation reaction was done with either ethylene oxide or a mixture of ethylene oxide/propylene oxide for comparison with alkyoxylation with either ethylene carbonate or a mixture of ethylene carbonate/propylene carbonate. Both high molecular weight and low molecular weight phenol-formaldehyde resin was used in these comparisons. The crude oil emulsion used for these tests was obtained from a producing formation located in Wyoming. Test conditions and dosages were identical during the test. The results are presented in Table A as follows:

TABLE A

| Bottle Test Results | | | |
|---|---|---|---|
| Acceptor | Reactant | Treat* | Actual Data** |
| HMW Resin | ethylene oxide | fair | 0.7 (ref = 0.0) |
| | ethylene carbonate | good | 0.3 (ref = 0.0) |
| LMW Resin | ½ propylene oxide/ ethylene oxide mixture | fair | 2.2 (ref = 0.8) |
| | ½ propylene carbonate/ ethylene carbonate mixture | good | 1.2 (ref = 0.8) |

*relative to commercial blend
**percentage of water in oil phase

In Table A, a preferred result is shown when the amount of water found in the oil phase after treatment with the emulsion breaker is as low as possible. As can be seen, the alkoxylated carbonated modified resins outperform the simple alkoxylated resins under similar conditions. The compounds represented in Table A contained about 75-80 weight percent phenol-formaldehyde resins, both low and high molecular weight fractions. When the backbone resin concentration is increased above about 30-40 weight percent, the comparison between normal alkoxylated resin and carbonated alkoxylated resin is not meaningful, since both materials give unacceptably high amounts of water retention in the oil phase of the treated crude oil, at least under our test conditions using this Wyoming Crude Oil.

The bottle tests referred to above simply require that a known volume of crude oil (here, 100 cc) is treated with the test emulsion breaker, test ranges are normally from 50-400 parts per million breaker, based on crude oil, preferably between 100-250 ppm, and most preferably between about 110-175 ppm, particularly for this Wyoming Crude. The bottle contents are mixed for 1-5 minutes at ambient temperatures and allowed to stand for initial phase separation for from about 15 minutes to up to about 3-4 hours. The treated crudes are then placed in a water bath and heated to a temperature that approximates the formation temperature of the geological formation from which the crude oil was obtained (here, about 140° F.), again shaken or mixed for from 1-5 minutes at this temperature and then allowed to sit quietly for phase separation (at temperature) for a time period ranging from several minutes to up to 72 hrs. or more. In this case, the separation treatment time ranged from about 3 hrs. to about 4.5 hours. The oil phase is then sampled and water content is measured by normal technique known in the art. The lowest amount of water is preferred.

Having described my invention, we claim:

1. A method of breaking crude oil emulsion, which comprises treating said emulsion with an effective amount of an emulsion breaker represented by a product obtained by reacting, in anhydrous condition, for at least one hour, an alkyl substituted phenol-formaldehyde polymer having the structure:

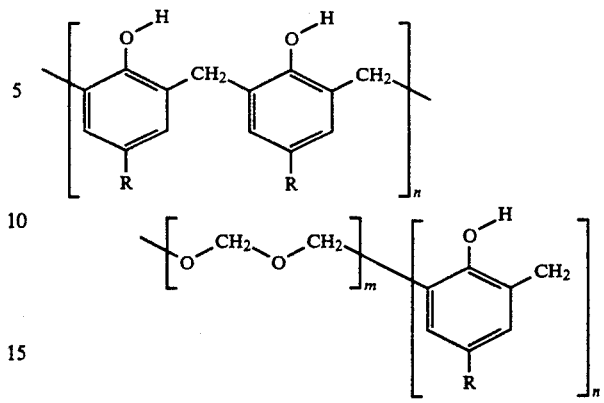

wherein R is a linear or branched alkyl group having from 4-20 carbon atoms, and wherein m and n are both independent integers, the sum of which is sufficient to achieve a molecular weight of at least 1000 and further that m, but not n, may be zero; with (b) ethylene carbonate, said reaction being further accomplished in an oleophilic solvent having a boiling point of at least 180° C., the reaction further at a temperature of at least 160° C. in the presence of an alkaline catalyst, said catalyst being present at a concentration, based on total weight of reactants a & b, of at least about 0.1 weight percent.

2. The method of claim 1 wherein the emulsion breaker is obtained by reacting for at least two hours the phenolformaldehyde polymer with from 1-20 moles of ethylene carbonate per mole polymer at a temperature of between 165° C.-195° C. in the presence of from 0.5-5.0 weight percent, based on reactants a and b, of an alkaline catalyst chosen from the group consisting of sodium hydroxide, potassium hydroxide, sodium carbonate, and mixtures thereof.

3. The method of claim 2 wherein the emulsion breaker is obtained by reacting ingredients a and b in solvent chosen from the group consisting of aromatics, alkyl aromatics, alkanes, and mixtures thereof at temperatures ranging between about 165° C.-190° C. for between about 2-48 hours.

4. The method of claim 2 wherein the emulsion breaker is obtained by incrementally adding in quantities of at least 0.1 weight percent of the total amount required, ethylene carbonate to the phenol-formaldehyde polymer dissolved in a solvent, said incremental adding being completed within about 20 percent of the total reaction time of from 2 to about 40 hours.

5. The method of claim 1 wherein the emulsion breaker has an infrared absorbance peak at about 1750 reciprocal centimeters.

* * * * *